Feb. 7, 1956 H. HEINS 2,734,171

MICROWAVE SWITCHING AND ATTENUATOR DEVICE

Filed Feb. 2, 1954 8 Sheets-Sheet 1

INVENTOR.
HAROLD HEINS
BY Edgar O. Rost
ATTORNEY

Feb. 7, 1956 H. HEINS 2,734,171

MICROWAVE SWITCHING AND ATTENUATOR DEVICE

Filed Feb. 2, 1954 8 Sheets-Sheet 2

*INVENTOR.*
HAROLD HEINS
*BY* Edgar O. Root
ATTORNEY

Feb. 7, 1956 H. HEINS 2,734,171

MICROWAVE SWITCHING AND ATTENUATOR DEVICE

Filed Feb. 2, 1954 8 Sheets-Sheet 3

INVENTOR.
HAROLD HEINS
BY Edgar O. Rost
ATTORNEY

MICROWAVE SWITCHING AND ATTENUATOR DEVICE

Filed Feb. 2, 1954 8 Sheets-Sheet 4

*INVENTOR.*
HAROLD HEINS
*BY* Edgar O. Rost
ATTORNEY

Feb. 7, 1956 H. HEINS 2,734,171

MICROWAVE SWITCHING AND ATTENUATOR DEVICE

Filed Feb. 2, 1954 8 Sheets-Sheet 5

*INVENTOR.*
HAROLD HEINS
*BY* Edgar O. Rost
ATTORNEY

Feb. 7, 1956 H. HEINS 2,734,171

MICROWAVE SWITCHING AND ATTENUATOR DEVICE

Filed Feb. 2, 1954 8 Sheets-Sheet 6

INVENTOR.
HAROLD HEINS
BY Edgar O. Rost
ATTORNEY

Feb. 7, 1956 H. HEINS 2,734,171

MICROWAVE SWITCHING AND ATTENUATOR DEVICE

Filed Feb. 2, 1954 8 Sheets-Sheet 7

INVENTOR.
HAROLD HEINS
BY Edgar O. Rost
ATTORNEY

INVENTOR.
HAROLD HEINS
BY Edgar O. Rost
ATTORNEY

United States Patent Office 2,734,171
Patented Feb. 7, 1956

1 2

2,734,171

MICROWAVE SWITCHING AND ATTENUATOR DEVICE

Harold Heins, Marblehead, Mass., assignor to Bomac Laboratories Inc., Beverly, Mass., a corporation of Massachusetts Application February 2, 1954, Serial No. 407,707

8 Claims. (Cl. 333—13)

The present invention relates generally to a microwave frequency switching device for radio direction and ranging systems and more particularly to a novel device for protection of the sensitive receiving apparatus employed in such systems.

A microwave frequency switching device now commonly employed in radar systems is the transmit receive, or TR, tube which permits the use of a common antenna for transmission and receiving. During transmission of the high power pulse, ionization of a gaseous atmosphere within a resonant cavity having spaced discharge electrodes de-couples the sensitive receiving apparatus from the system. The position of the TR tube also permits essentially all of the reflected returning radio signals to be transmitted to the receiver since these signals are at too low a power level to cause ionization.

The receiving apparatus employed in such systems has a sensitive crystal detector and amplifier. Since the detector crystals will be "burned out" or damaged by exposure to stray radio frequency radiation, a problem exists in protecting the receiver when a system is not in use and transmitters of adjacent systems may be operating. Various mechanical shutters have been designed to block such stray radiation, however, such devices are somewhat bulky and require additional wave guide structure, thus increasing the cost and the weight of a radar system.

To successfully protect the receiver during periods of non-operation of the system, it is desirable to present a high degree of attenuation in the branch of the wave guide circuit leading from the antenna to the receiver. A metallic member extending across the wave guide section furnishes some degree of attenuation, however, I have discovered that an even more efficient attenuation may be attained with a resonant cavity microwave attenuator as disclosed in my co-pending application Serial Number 355,128, filed May 14, 1953, and assigned to the same assignee as the present application. The device therein disclosed provides a continuous short circuit between a pair of spaced discharge electrodes within a resonant cavity and electromagnetic means for rapid removal of the shorting element. This device may be mounted in wave guide structure preceding the switching device and receiver.

In certain applications, however, it would be advantageous to incorporate the protective features of the microwave attenuator with those of a TR switching tube, such as in airborne radar systems where space and weight savings are desirable.

It is, therefore, an object of the present invention to provide a novel microwave switching device having a shutter mechanism for attenuation of radio frequency signals incorporated therein.

Another object is to provide a novel combination of a transmit receive tube and resonant cavity attenuator in an integral structure for protection of the receiver apparatus in radar systems.

A further object is to provide in a transmit receive switching device an easily removable attenuating element for the protection of radio receiving apparatus in a radar system from undesired radio frequency energy radiation which may damage the receiving apparatus.

A still further object is to provide means for attenuation of radio frequency energy and a gaseous discharge switching device in an efficient, easily operated, inexpensive unitary structure.

To attain the afore-mentioned objects, the invention discloses a device having an evacuated envelope with discharge gap structure therein and an electromagnetically controlled attenuating member which effectively short circuits the discharge gap when in full attenuating position with an accompanying high impedance and insertion loss. The attenuation may be readily removed by a low voltage source energizing the electromagnet operatively associated with the attenuating element. After removal of the attenuating element the device disclosed performs as a switching tube.

Switching devices may be fabricated of the integral resonant cavity or cell type construction, as well as those embodiments that provide broad frequency band coverage with plural resonant discharge gap structure. In addition, the device may be fixed tuned to a pre-determined frequency or may be tunable over a selected frequency range.

The present invention discloses structure which is readily adaptable to the various embodiments easily and efficiently.

The objects, features and advantages will be more readily appreciated after consideration of the following detailed specification and accompanying drawings in which.

Figure 1:
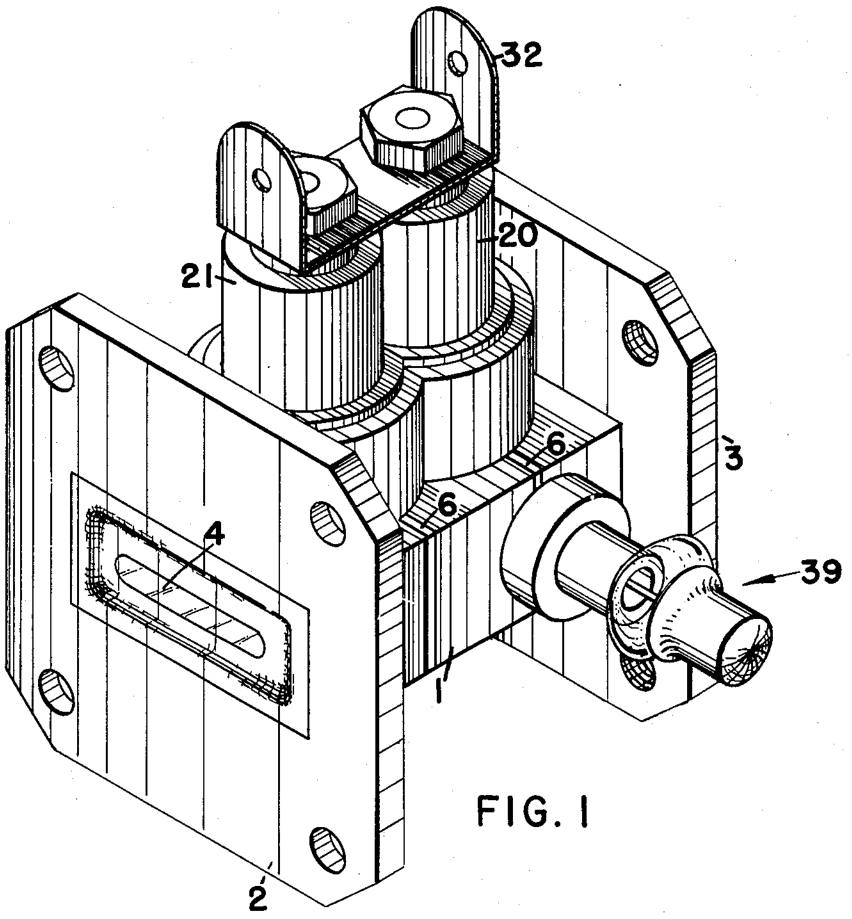
Figure 1 is a perspective view of an embodiment of the present invention.
Figures 2, 3:
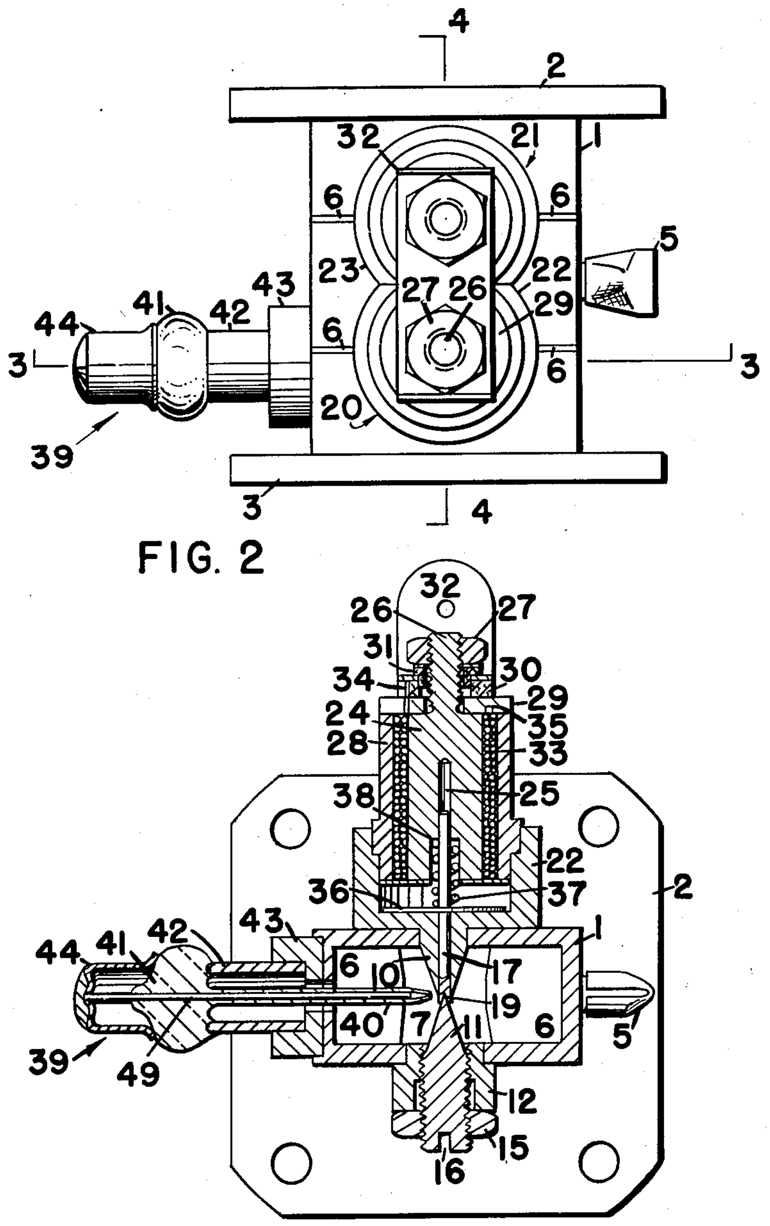
Figure 2 is a plan view of the embodiment shown in Figure 1.
Figure 3 is a detailed cross sectional view along the line 3—3 in Figure 2.
Figure 4:
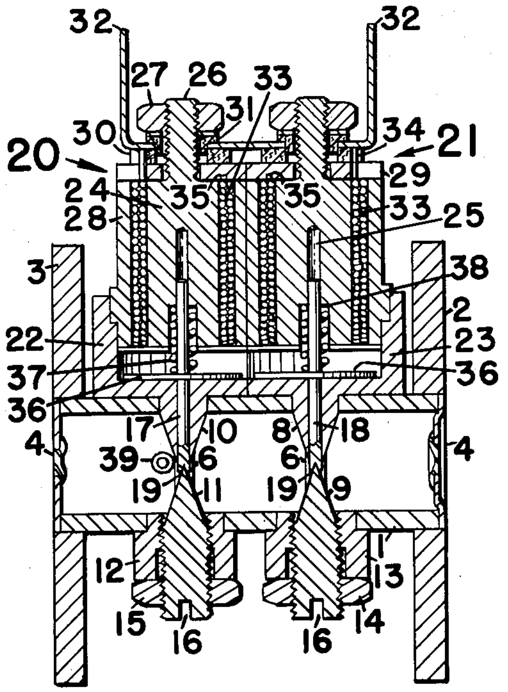
Figure 4 is a longitudinal cross sectional view along the line 4—4 in Figure 2.

Referring to the drawings, the device shown in Figures 1 to 4 is an illustrative embodiment for use in broad band applications and comprises a length of rectangular wave guide 1 secured between end flanges 2 and 3. Each flange is provided with a resonant glass window 4 to transmit electromagnetic energy through the wave guide 1 and form a hermetically sealed envelope. The tube may be filled with an ionizable atmosphere under reduced pressure to provide a gaseous discharge when high level energy is transmitted to one of the windows 4. Exhaust tubulation 5 extends into wave guide 1 to provide means for evacuating the envelope and filling it with a gas fill at the desired pressures.

Spaced at intervals of approximately a quarter of a wavelength and extending transversely inside wave guide 1 are a plurality of metal plates 6 forming resonant irises 7. Disposed within each iris 7 are spaced resonant discharge gap electrodes 8, 9 and 10, 11 having convergent ends. Electrodes 9 and 11 are in threaded engagement with sleeves 12 and 13 and nuts 14 and 15 to provide for axial adjustment of the spacing between the electrodes.

Adjustment of gap spacing to the desired resonant frequency may be accomplished by inserting a screw driver in the slots 16 provided at the threaded ends of electrodes 9 and 11. After the tuning adjustment, the spacing may be fixed by soldering the outer ends of electrodes 9 and 11.

Gap electrodes 8 and 10 are provided with an axial passage with an attenuating element 17 and 18 slidably disposed within these passages. The elements 17 and 18 are of a conductive metal, desirably brass, or any other suitable metal in the form of a rod or plunger. The inner tip of these elements have conical shaped bore 19 adapted to engage the tip of opposed electrodes 9 and 11 when in full attenuating position. In this position electromagnetic energy will be effectively reflected to prevent transmission to the receiver.

To remove the attenuating elements 17 and 18, I next provide a pair of electromagnets shown generally at 20 and 21 hermetically sealed to metal rings 22 and 23 which form the upper section of electrodes 8 and 10 and which are, in turn, sealed to wave guide 1. Specifically, the electromagnet comprises a core 24 of a magnetic material having an axial bore 25 extending from its inner end adapted to receive the attenuating elements in the retracted position. A reduced threaded portion 26 extends from the other end to receive a mounting nut 27.

Each electromagnet compirses a cylindrical outer shell 28 supported by ring 22 and an end plate 29 sealed to shell 28. Threaded portion 26 extends through end plate 29 and nut 27 securely retains insulating washers 30 and 31 and electrical terminal 32 thereon.

Surrounding core 24 is an electrical coil 33 having a lead 34 connected to terminal 32 and the other lead 35 grounded to end plate 29. An armature 36 of a suitable ferro-magnetic material is attached to each attenuating element 17 and 18 at an intermediate point. Spring 37 rests against armature 36 and shoulder 38 provided in axial bore 25. When the electromagnet is energized, armature 36 is attracted to core 24 and overcomes the tension of spring 37, thereby removing the attenuating element 17 and 18 from the full attenuating position. Upon disconnection of the energizing circuit, armature 36 is urged forward by spring 37 to return the attenuator to its position contacting opposed electrode 9 or 11.

In the illustrative embodiment a keep-alive electrode 39 extends through wave guide section 1 and maintains a source of partial ionization between adjacent electrodes 10 and 11 to facilitate ionization when the device is employed as a switching device and the attenuating elements are in the non-attenuating position. Electrode 39 includes a core of a conductive metal 49 with a glass sheath 40 and is supported by a glass bead 41 sealed to metal tube 42 which is hermetically sealed to collar 43 mounted on wave guide 1. A terminal cap 44 is provided for connection to a direct current voltage supply.

A suggested circuit for energizing the described electromagnet is set forth in my co-pending application mentioned previously.

Figure 5:
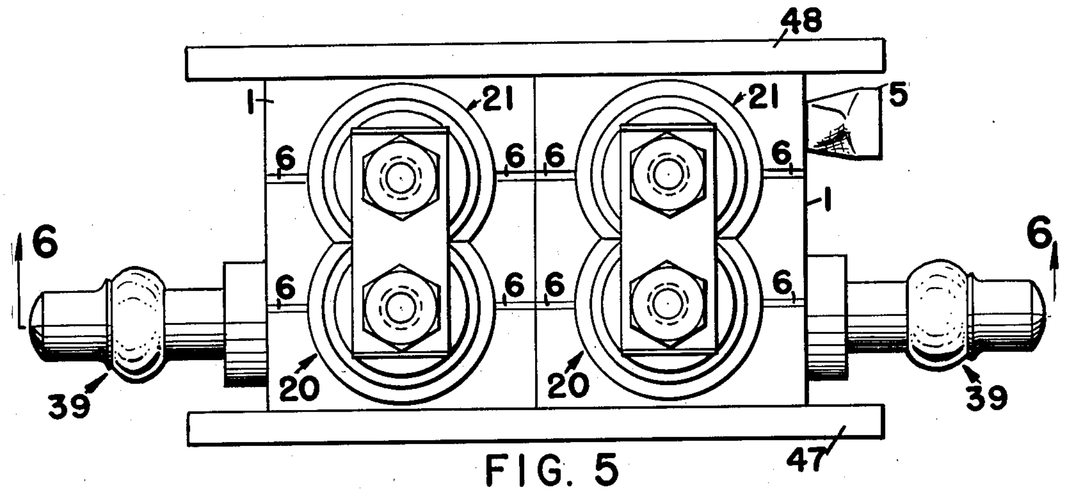
Figure 5 is a plan view of an alternative embodiment.
Figure 6:
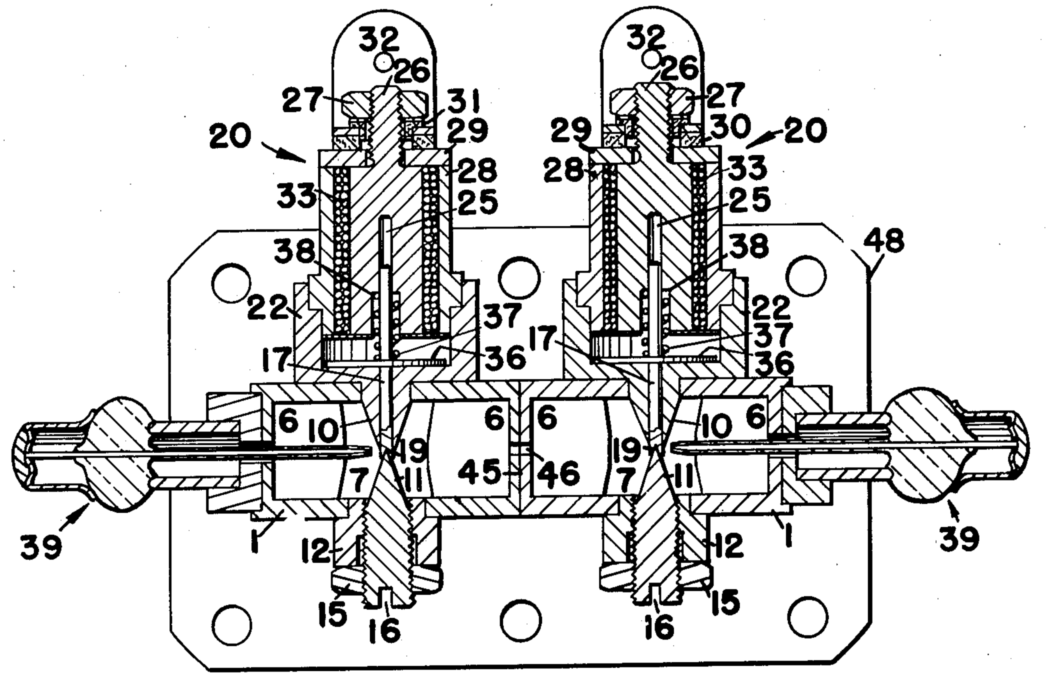
Figure 6 is a detailed cross sectional view along the line 6—6 in Figure 4.

Another embodiment of the present invention shown in Figures 5 and 6 is a dual broad band switching device employed in duplexing systems and coupled to short slot hybrid junctions of the type described on page 180 of The Proceedings of the Institute of Radio Engineers issued February 1952.

The overall structure of this embodiment is identical to that shown in Figures 1 to 4 and similar reference numerals have been indicated where applicable. An additional feature of this embodiment is found in the common wave guide wall section 45 which has an aperture 46 to permit filling of both sections with an ionizable atmosphere through a single exhaust tubulation 5. It will also be noted that each section of the common wall 45 is approximately one half the thickness of the other wall portions, so that, upon uniting, the combined wall structure will still be approximately the same thickness as the other wall portions of wave guide 1. In this embodiment four attenuating elements and electromagnets have been employed to cooperate with the four resonant discharge gap structures provided in this embodiment. To couple the device shown in wave guide structure, end flanges 47 and 48 of an elongated rectangular shape have been sealed at each end of wave guide sections 1.

Figure 7:
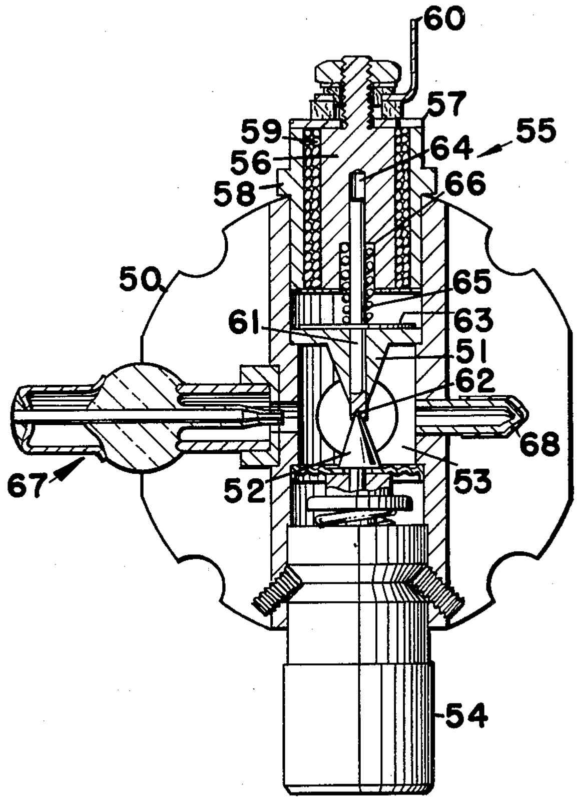
Figure 7 is a longitudinal sectional view of another embodiment.

Another embodiment shown in Figure 7 comprises substantially cylindrical envelope 50 having an axial passageway therethrough. Spaced within the passageway are conical discharge gap electrodes 51 and 52 which form resonant cavity 53. Conical electrode 52 may be adjusted during operation to the desired frequency by means of differential screw mechanism within housing 54. Disposed at the opposite end of the passageway is an electromagnet 55 having core 56, end plate 57, outer shell 58, and coil 59 with external electrical terminal 60. Operatively associated with the electromagnet is attenuating element 61 which extends into the resonant cavity 53 through a hollow passage in electrode 51. The element 61 is provided with a conical aperture 62 at one end and extends across the discharge gap to contact the opposed electrode 52. Armature 63 at an intermediate point of element 61 provides means for retraction from the attenuating position when electromagnet 55 is energized. The other end of element 61 extends into an axial passage 64 in core 56 with spring 65 resting against shoulder 66 in axial passage 64 and armature 63. When the electromagnet is de-energized, element 61 will be returned to the attenuating position by spring 65.

A keep-alive electrode 67 of known construction extends axially through envelope 50 with the inner end supplying a source of electrons to the resonant cavity 53. The device is evacuated and filled with an ionizable atmosphere commonly employed in TR switching devices by means of tubulation 68.

Figure 8:
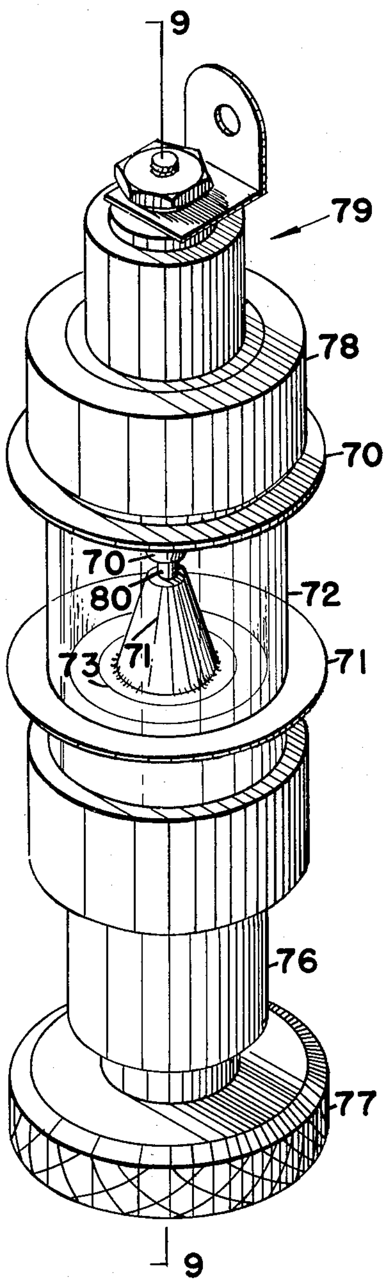
Figure 8 is a perspective view of still another embodiment.
Figure 9:
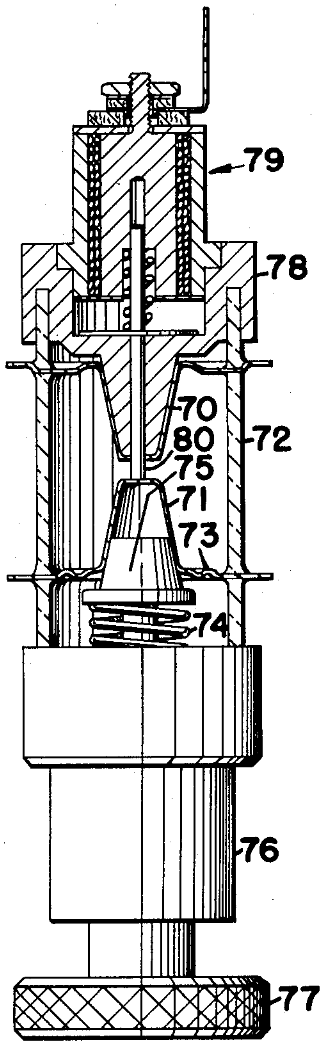
Figure 9 is a detailed cross sectional view along the line 9—9 in Figure 8.

Figures 8 and 9 illustrate another protective device of well known construction that is incorporated in an external resonant cavity and is tunable over a wide frequency band. In this embodiment a pair of opposed substantially frusto-conical disc electrodes 70 and 71 are sealed to envelope 72 of a dielectric material with the edges of the discs extending through the envelope. The exposed metallic edges contact the external resonant cavity to form a composite resonant circuit in a manner well known in the art. Electrode 71 is provided with a deformable section 73 to facilitate adjustment of the spacing between the electrodes 70 and 71, which may be accomplished by means of spring 74, tuning stud 75 and a differential screw mechanism within housing 76. The tuning adjustment is controlled by a knob 77.

The attenuating mechanism may be mounted at the opposed end of envelope 72 by means of a base of a conductive metal 78 sealed to the dielectric envelope 72. Base 78 has a frusto-conical section cooperating with the walls of electrode 70. An electromagnet 79 of the same construction previously described is hermetically sealed to base 78.

In this embodiment the attenuating element 80 extends through a hollow passageway in the frusto-conical section of base 78 and an aperture in the apex of electrode 70 to contact the substantially blunt end of electrode 71 to provide the attenuation across the discharge gap.

The specific embodiment here described is generally employed in systems where high power electromagnetic energy is transmitted. It is, therefore, not essential to the initiation of a discharge to employ an ionizable atmosphere under reduced pressure. Base 78 may, therefore, be sealed to the dielectric envelope by suitable basing cements and a normal atmospheric pressure maintained within the envelope.

Figure 10:
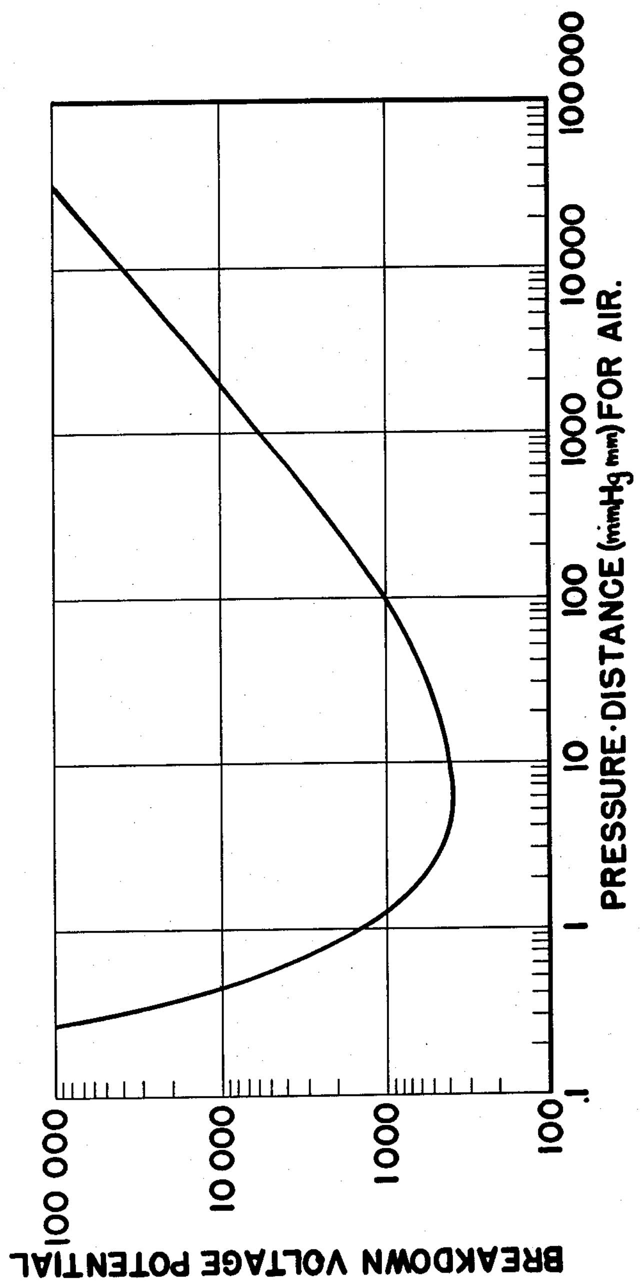
Figure 10 is a Paschen curve of breakdown potential and gas pressures.

While several embodiments illustrative of a combined gaseous discharge switching device and attenuator have been described, another usage of my invention that has been discovered is to employ it as a high power switching device in a wave guide system. By adjusting the pressures of the internal atmosphere it is possible to take advantage of the Paschen relation shown in Figure 10. Since the breakdown potential varies linearly with gas pressures over some regions, but is non-linear over other regions, it is possible to adjust the pressures either above or below the minimum breakdown potential of any selected gas to handle any desired voltage. In the course of experiments with embodiments of the invention having a metallic envelope, power levels of 100 kilowatts and higher have been handled by either evacuating the envelope to pressure values approaching the asymptotic portion of the curve or the device may be filled with air or other gases such as Freon under high pressures. It is thus possible to permit the passage of desired power levels through a portion of a wave guide system without initiating a gaseous discharge. With the attenuating member in the shorting position between the electrodes the energy will be effectively blocked from that branch of the system and switched to another branch.

It will be evident that the device disclosed has many uses and may be modified or altered in various ways by those skilled in the art. It is, therefore, my invention to cover in the appended claims such modifications or alterations as fall within the spirit and scope of the invention.

What is claimed is:

1. A microwave switching and attenuator device comprising a hermetically sealed envelope containing a gaseous atmosphere under reduced pressure, resonant discharge gap electrode structure mounted within said envelope, an attenuating element of a conductive metal operatively associated with said discharge gap electrode structure to present a short circuit across said discharge gap, electromechanical means mounted on said envelope for moving said attenuating element relative to said gap for removing the short circuit thereacross and an ignitor electrode extending into said envelope with its inner tip in close proximity to said discharge gap.

2. A microwave switching and attenuator device comprising a gas-filled envelope including a length of rectangular waveguide having resonant window elements hermetically sealed at the ends thereof, plural inductive iris members and opposed resonant discharge gap conical electrode structure mounted transversely inside said waveguide at spaced intervals of approximately one quarter of a wavelength, at least one of said discharge gap electrodes having a hollow passageway therethrough, an attenuating element of a conductive metal slidably disposed within said hollow electrode to contact the opposed electrode when in full attenuating position, electromechanical means mounted on said waveguide envelope in axial alignment with said hollow electrode to retract said attenuating element to a non-attenuating position within said hollow electrode when energized and an ignitor electrode extending transversely into said waveguide envelope with its inner tip in close proximity to said discharge gap electrode structure.

3. A microwave switching and attenuator device according to claim 2 wherein a flat armature of a magnetic material is mounted transversely at an intermediate point on said attenuating element, said armature contacting the large end of said hollow conical electrode when said attenuating element is a full attenuating position.

4. A microwave switching and attenuator device according to claim 2 wherein said attenuating element is maintained in full attenuating position by means of a resilient compressible spring urging said armature downwardly.

5. A microwave switching and attenuator device according to claim 2 wherein the non-contacting end of said attenuating element is enclosed by said electromechanical means.

6. A dual microwave switching and attenuator device comprising a plurality of mutually parallel rectangular waveguide gas-filled envelope sections joined together with each section sharing a common narrow waveguide wall with an aperture therein, each section having resonant window elements hermetically sealed at the ends thereof, plural inductive iris members and opposed resonant discharge gap conical electrode structure mounted transversely inside each waveguide section at spaced intervals of approximately one quarter of a wavelength, at least one of said discharge gap electrodes in each section having a hollow passageway therethrough, an attenuating element of a conductive metal slidably disposed within each hollow electrode to contact the opposed electrode when in full attenuating position, electromechanical means mounted on each waveguide section in axial alignment with each hollow electrode to retract said attenuating element to a non-attenuating position within each hollow electrode and an ignitor electrode extending transversely into each waveguide section from the opposed non-joined narrow waveguide wall.

7. A microwave switching and attenuator device comprising a tubular dielectric envelope, a pair of hollow frusto-conical electrodes hermetically sealed at intermediate portions of said envelope with opposed spaced convergent ends forming a discharge gap, a base of a conductive metal hermetically sealed at one end of said envelope, said base having a frusto-conical section engaging the walls of one of said hollow frusto-conical electrodes and a hollow passageway extending through said section, an attenuating element of a conductive metal slidably disposed within said passageway and extending across said discharge gap to contact the opposed electrode when in full attenuating position and electromechanical means to retract said element when energized hermetically sealed to said metallic base in axial alignment with the frusto-conical electrodes.

8. A microwave switching and attenuator device comprising a substantially cylindrical conductive envelope having an axial passage therethrough, a pair of spaced electrodes defining a discharge gap disposed in said passageway at least one of said electrodes being hollow, an attenuating element of a conductive metal slidably disposed within said hollow electrode and extending across said discharge gap to contact the opposed electrode when in full attenuating position, electromechanical means to retract said element when energized hermetically sealed at one end of said axial passage and an ignitor electrode extending transversely into said envelope with the inner tip of said electrode terminating a short distance from the wall of said axial passage.

References Cited in the file of this patent

UNITED STATES PATENTS

| | | |
|---|---|---|
| 2,419,903 | McCarthy | Apr. 29, 1947 |
| 2,499,777 | Pound | Mar. 7, 1950 |
| 2,524,268 | McCarthy | Oct. 3, 1950 |
| 2,668,276 | Schooley | Feb. 2, 1954 |
| 2,714,193 | Broderick | July 26, 1955 |

OTHER REFERENCES

Bollinger et al.: Abstract of application S. N. 694,044, published Nov. 21, 1950, vol. 640, O. G. pg. 1032.